(12) United States Patent
Nilsson

(10) Patent No.: US 9,779,278 B2
(45) Date of Patent: Oct. 3, 2017

(54) ELECTRONIC DEVICE COMPRISING FINGERPRINT SENSOR

(71) Applicant: Fingerprint Cards AB, Gothenburg (SE)

(72) Inventor: Henrik Nilsson, Malmo (SE)

(73) Assignee: Fingerprint Cards AB, Gothenburg (SE)

( * ) Notice: Subject to any disclaimer, the term of this patent is extended or adjusted under 35 U.S.C. 154(b) by 0 days.

(21) Appl. No.: 15/063,754

(22) Filed: Mar. 8, 2016

(65) Prior Publication Data
US 2016/0300095 A1    Oct. 13, 2016

(30) Foreign Application Priority Data
Apr. 7, 2015   (SE) ........................... 1550411

(51) Int. Cl.
*G06K 9/00* (2006.01)
*G06K 9/03* (2006.01)
*G06K 9/32* (2006.01)

(52) U.S. Cl.
CPC ....... *G06K 9/0002* (2013.01); *G06K 9/00053* (2013.01); *G06K 9/036* (2013.01); *G06K 9/3216* (2013.01)

(58) Field of Classification Search
None
See application file for complete search history.

(56) References Cited

U.S. PATENT DOCUMENTS

| 5,126,220 A * | 6/1992 | Tokitomo .................. G03F 1/30 250/398 |
| 6,545,486 B2 | 4/2003 | Lane et al. |
| 7,366,331 B2 * | 4/2008 | Higuchi ............. G06K 9/00046 340/5.53 |

(Continued)

FOREIGN PATENT DOCUMENTS

| EP | 1 884 883 | 2/2008 |
| JP | 2001-092951 | 4/2001 |

(Continued)

OTHER PUBLICATIONS

International Search Report from PCT/SE2016/050280, dated Jun. 7, 2016.

*Primary Examiner* — Feng Niu
(74) *Attorney, Agent, or Firm* — Westman, Champlin & Koehler, P.A.

(57) ABSTRACT

The present invention relates to an electronic device comprising a capacitive fingerprint sensor having a fingerprint sensing surface forming part of an exterior surface of the electronic device; a protective film arranged on the exterior surface of the electronic device comprising the fingerprint sensing surface; wherein the protective film is arranged to at least partially cover the fingerprint sensing surface; and wherein the protective film comprises an electrically conductive pattern covering the fingerprint sensing surface, the electrically conductive pattern being configured to enable verification of a functionality of the fingerprint sensor. The invention also relates to a method of manufacturing an electronic device comprising a fingerprint sensor, and to a method of verifying a functionality of a fingerprint sensor.

15 Claims, 4 Drawing Sheets

(56) References Cited

U.S. PATENT DOCUMENTS

| | | | |
|---|---|---|---|
| 7,584,068 B2* | 9/2009 | Xu | G06K 9/0002 |
| | | | 702/104 |
| 7,764,273 B2* | 7/2010 | Weng | G06F 3/0416 |
| | | | 178/18.06 |
| 7,907,754 B2* | 3/2011 | Niinuma | G06K 9/0012 |
| | | | 340/5.82 |
| 8,692,777 B2 | 4/2014 | Staton et al. | |
| 8,786,033 B2* | 7/2014 | Saito | A61B 5/1172 |
| | | | 257/124 |
| 9,189,033 B2* | 11/2015 | Takahashi | G06F 3/044 |
| 9,576,176 B2* | 2/2017 | Gozzini | G06K 9/0002 |
| 2003/0230725 A1* | 12/2003 | Wong | G01J 1/429 |
| | | | 250/372 |
| 2006/0001651 A1* | 1/2006 | Weng | G06F 3/0416 |
| | | | 345/173 |
| 2006/0285728 A1 | 12/2006 | Leung et al. | |
| 2007/0253607 A1 | 11/2007 | Higuchi | |
| 2008/0025582 A1* | 1/2008 | Kobayashi | G06K 9/00013 |
| | | | 382/124 |
| 2010/0208953 A1* | 8/2010 | Gardner | G06K 9/00006 |
| | | | 382/124 |
| 2011/0279410 A1* | 11/2011 | Han | G06F 3/044 |
| | | | 345/174 |
| 2014/0036165 A1* | 2/2014 | Takahashi | G06F 3/044 |
| | | | 349/12 |
| 2014/0059790 A1* | 3/2014 | Bushaw | B08B 1/006 |
| | | | 15/118 |
| 2014/0354310 A1 | 12/2014 | Hargrove et al. | |
| 2015/0015537 A1* | 1/2015 | Riedijk | G06F 3/044 |
| | | | 345/174 |
| 2015/0022670 A1 | 1/2015 | Gozzini et al. | |
| 2015/0102829 A1* | 4/2015 | Son | G06K 9/00053 |
| | | | 324/692 |
| 2016/0004899 A1* | 1/2016 | Pi | G06F 1/1626 |
| | | | 345/173 |
| 2016/0026846 A1* | 1/2016 | Lin | G06K 9/0002 |
| | | | 382/124 |
| 2016/0228924 A1* | 8/2016 | Bushaw | A47L 25/00 |
| 2016/0253542 A1* | 9/2016 | Lee | G06K 9/0002 |
| | | | 382/126 |
| 2016/0337053 A1* | 11/2016 | Diperna | H04B 17/11 |
| 2016/0350580 A1* | 12/2016 | Pyun | G06K 9/00073 |

FOREIGN PATENT DOCUMENTS

| | | |
|---|---|---|
| KR | 10-2013-0009520 | 1/2013 |
| WO | WO 2013/172604 | 11/2013 |

* cited by examiner

ELECTRONIC DEVICE COMPRISING FINGERPRINT SENSOR

CROSS-REFERENCE TO RELATED APPLICATION

The present application is based on and claims the benefit of Swedish patent application Serial No. 1550411-1, filed Apr. 7, 2015, the content of which is hereby incorporated by reference in its entirety.

FIELD OF THE INVENTION

The present invention relates to a sensing device. More particularly, the present invention relates to an electronic device comprising a device for sensing fingerprints, and to a protective film for such an electronic device.

TECHNICAL BACKGROUND

As the development of biometric devices for identity verification, and in particular of fingerprint sensing devices, has lead to devices which are made smaller, cheaper and more energy efficient, the possible applications for such devices are increasing.

In particular fingerprint sensing has been adopted more and more in, for example, consumer electronic devices, due to small form factor, relatively beneficial cost/performance factor and high user acceptance.

Capacitive fingerprint sensing devices built based on CMOS technology for providing the fingerprint sensing elements and auxiliary logic circuitry are increasingly popular as such sensing devices can be made both small and energy efficient while being able to identify a fingerprint with high accuracy. Thereby, capacitive fingerprint sensors are advantageously used for consumer electronics, such as portable computers, tablet computers and mobile phones, e.g. smartphones.

Manufacturing an electronic device often involves assembling a large number of components which have been manufactured elsewhere. It is customary to verify the functionality of each component after it has been produced. However, there is also a need to verify the functionality of individual components in the electronic device after the device has been fully assembled to ensure that the end user receives a fully functional device.

In particular, it is desirable to test the fingerprint sensor so that it is working as expected and that it captures images of sufficiently high quality. Since it is not practical to test the fingerprint sensor with an actual finger, a test rig can be used which comprises a rubber stamp or a rubber probe having a pattern allowing the functionality of the fingerprint sensor to be verified.

However, such a rubber stamp may become worn which can lead to a degradation of the acquired test image, or at least to inconsistencies in the measurements since the pattern will wear and thus not stay the same when used for a large number of measurements. Moreover, arranging a rubber stamp or probe in contact with the sensor requires a dedicated machine setup to mechanically position the test pattern on the fingerprint sensor, thereby making the overall assembly process more complicated.

Accordingly, it is desirable to simplify testing of a fingerprint sensor in an electronic device.

SUMMARY OF THE INVENTION

In view of the above-mentioned desired properties of testing a fingerprint sensing device, and the above-mentioned and other drawbacks of the prior art, it is an object of the present invention to simplify testing of a fingerprint device arranged in an electronic device.

According to a first aspect of the present invention, it is therefore provided an electronic device comprising a capacitive fingerprint sensor having a fingerprint sensing surface forming part of an exterior surface of the electronic device; a protective film arranged on the exterior surface of the electronic device comprising the fingerprint sensing surface; wherein the protective film is arranged to at least partially cover the fingerprint sensing surface; and wherein the protective film comprises an electrically conductive pattern covering the fingerprint sensing surface, the electrically conductive pattern being configured to enable verification of a functionality of the fingerprint sensor.

An electronic device should in the present context be considered to include any device which may benefit from biometric identification of a user by means of a fingerprint sensor. The electronic device may for example be a smartphone, a tablet computer, a portable or stationary computer or the like.

A capacitive fingerprint sensor comprises an array of sensing elements, where each sensing element also may be referred to as a pixel. Each sensing element is connected to readout circuitry and configured to detect a capacitive coupling between the sensing element and a finger placed on the sensing surface of the fingerprint sensor. In particular, the fingerprint sensor is configured to detect the difference in capacitive coupling between a ridge and a valley of the fingerprint so that an image of a fingerprint can be captured. To simplify discussions, a pixel located directly under a conductive portion of the pattern can be considered to be "black", and a pixel located directly under a non-conductive portion can be considered to be "white". This simplified approach corresponds to ridges and valleys of a fingerprint where the higher capacitive coupling from a ridge can be interpreted as being "black" and the lower capacitance of the ridge can be interpreted as being "white". In reality, the detected capacitance may vary continuously between a minimum and maximum capacitance value. During testing of the fingerprint sensor, black and white can be defined as different respective capacitance ranges located at the respective ends of the overall measurable capacitance range, and the intermediate capacitance range can be represented by a greyscale.

The present invention is based on the realization that an improved testing methodology for verifying a functionality of a fingerprint sensor can be achieved by utilizing a protective film arranged on the fingerprint sensing device. Many electronic devices are already today fitted with a protective plastic film for protecting the surface of a device during production and subsequently during shipping to the end customer. The inventors have realized that such a protective film may be configured to simultaneously be used to verify a functionality of a fingerprint sensor forming part of an exterior surface of the electronic device, and that this can be achieved by providing an electrically conductive pattern on a part of the protective film which covers the fingerprint sensor. The electrically conductive portions of the pattern will result in a higher capacitive coupling to corresponding sensing elements of the fingerprint sensor. Thereby, the fingerprint sensor can be controlled to capture an image corresponding to the electrically conductive pattern. The pattern may also be referred to as a test pattern. Through the use of suitable image analysis algorithms, a functionality of the fingerprint sensor can be verified without the use of a dedicated test rig and a stamp. This simplifies the manufacturing process of the electronic device, and it also improves the repeatability of the test method since the pattern on the film can be made with high accuracy, meaning that each fingerprint sensor in series of devices can be tested using practically identical patterns. Moreover, it can also be ensured that the variability of the distance from the sensing surface to the pattern between different devices is very small, and that the variability in the pattern itself is negligible.

The electrically conductive pattern can for example be used to verify that a sufficient percentage of the pixels of the fingerprint sensor are functional. The test pattern can also be used to verify that the sensing surface has not been scratched, since scratching typically results in degradation in quality of the captured image which would show when capturing a test image and comparing to the expected pattern.

According to one embodiment of the invention, the electrically conductive pattern may advantageously comprise alignment marks configured to enable determination of an alignment of the pattern. Through the use of alignment marks, the electrically conductive pattern covering the fingerprint sensor can be accurately identified even if the pattern is offset from the intended position or if the pattern is misaligned with respect to the fingerprint sensor. Thereby, the tolerances required when arranging the protective film on the electronic device can be relaxed. Moreover, the alignment marks may be used to identify different portions or regions of the test pattern.

In one embodiment of the invention, the electrically conductive pattern may advantageously comprise a solid pattern, stripe pattern or checkerboard pattern. Different patterns can be used for testing different functionalities of the fingerprint sensor. As an example, a solid pattern, i.e. a pattern comprising a solid film of an electrically conductive material can be used to verify that all pixels are functioning. As a further example, a pattern having parallel stripes of suitable thickness can be used to verify that the contrast in the captured image is sufficiently strong. The stripes, or lines, may have the same thickness over the full pattern, or stripes having different widths may be used. Furthermore, a checkerboard pattern having a sharp contrast can be used to determine the average number of resulting black and white pixels, thereby also determining the number of pixels being outside of the capacitance ranges defined as black and white. A fingerprint sensor can be deemed to be fully functional even if a number of individual pixels are non-functional. Moreover, the electrically conductive pattern can be configured so that different types of patterns cover different portions of the sensor.

According to one embodiment of the invention, the electrically conductive pattern may be transparent. In practice, any electrically conductive material providing a sufficiently strong capacitive coupling may be used to form the conductive pattern. A transparent conductive pattern may for example be desirable for aesthetic reasons.

According to one embodiment of the invention, the electrically conductive pattern may advantageously be arranged at a distance from the sensing surface not exceeding 200 μm. Since the capacitive coupling between the sensing element and the electrically conductive pattern is inversely proportional to the distance between the two, it is desirable to minimize the distance between the sensing surface and the electrically conductive pattern to ensure sufficient capacitive coupling. Typically, the fingerprint sensor also comprises cover layer, having the effect that there is already a certain distance between the sensing element and the sensing surface.

In one embodiment of the invention, the electrically conductive pattern may advantageously be arranged on a side of the protective film facing the sensing surface of the fingerprint sensing device. The smallest distance between the electrically conductive pattern and the sensing elements of the fingerprint sensor can be achieved by arranging the pattern in contact with the sensing surface, thereby providing the best possible capacitive coupling. Moreover, to achieve a good repeatability in the testing of fingerprint sensors it is preferred that the distance between the sensing elements and the pattern is constant over the entire sensing surface, and also that the distance does not differ from one device to another. Accordingly, by arranging the electrically conductive pattern in contact with the sensing surface, the distance can controlled with high accuracy.

According to one embodiment of the invention, the electrically conductive pattern may advantageously be printed on the protective film. Printing is a straight forward and readily available technique for forming a patter on a surface. Moreover, a commercially available conductive ink can be used to form the desired pattern and printing can also achieve sufficient pattern resolution.

In one embodiment of the invention, the protective film may advantageously be a transparent plastic film. Transparent plastic films are presently used to protect various surfaces of an electronic device. Accordingly, existing assembly processes are in many cases already configured to handle the application of such a film, and the addition of a conductive pattern to the protective film can be made without modifying the existing manufacturing process.

According to one embodiment of the invention, the protective film may be arranged to cover a majority of the surface of the electronic device comprising the fingerprint sensing surface. Thereby, an existing manufacturing process where a protective film is arranged to cover a majority of, or all of a surface of an electronic device can be accommodated. Alternatively, a protective film comprising an electrically conductive pattern can be arranged separately to only cover the sensing surface of the fingerprint sensor. In such case, a second protective film can be arranged covering the reminder of the electronic device, where the second protective film does not comprise any electrically conductive pattern.

In one embodiment of the invention, the fingerprint sensing surface may be a part of a surface of an electronic device comprising a display. In many applications, it is convenient to arrange the fingerprint sensor so that the sensing surface is on the same side as a display of the electronic device. This is the case for example for smartphones and tablet computers.

Furthermore, since displays in electronic devices are often being covered by a protective film during or after manufacturing, a protective film comprising an electrically conductive pattern can easily be incorporated into existing manufacturing or assembly processes. That being said, this does not exclude the use of a fingerprint sensor on surfaces of an electronic device not comprising a display. A fingerprint sensor can for example be arranged adjacent to or as part of a touch sensitive trackpad of a desktop computer, or as part of a keyboard for a portable or stationary computer.

As a further example, the fingerprint sensing surface may be a part of a surface of an electronic device opposite a surface of the electronic device comprising a display, such as on the backside of a smartphone or tablet computer.

According to one embodiment of the invention, the fingerprint sensor may comprise an electrically conductive ring surrounding the fingerprint sensor, wherein the electrically conductive pattern is arranged to be in electrical contact with the ring. In a fingerprint sensor comprising an electrically conductive ring, i.e. an electrode, for providing a potential to a finger placed on the fingerprint sensor, the pattern is preferably configured so that all the features of the pattern are in electrical contact with the electrode. Thereby, all the features of the pattern will have the potential of the electrode which in turn facilitates image capture.

According to a second aspect of the invention, there is provided a method for manufacturing an electronic device comprising the steps of providing a body of an electronic device, providing a fingerprint sensor having a sensing surface; arranging the fingerprint sensor in the body of the electronic device such that the sensing surface form part of an exterior surface of the electronic device; and arranging a protective film on the exterior surface of the electronic device comprising the fingerprint sensor; wherein the protective film is arranged to at least partially cover the fingerprint sensor; wherein at least a portion of the film comprises an electrically conductive pattern configured to enable verification of a functionality of the fingerprint sensor, the pattern being arranged to cover the fingerprint sensing device.

According to a third aspect of the invention, there is provided method for verifying a functionality of a fingerprint sensor having a fingerprint sensing surface forming part of an exterior surface of an electronic device, the method comprising the steps of: arranging a protective film on the exterior surface of the electronic device comprising the fingerprint sensor; wherein the protective film is arranged to at least partially cover the fingerprint sensor; arranging a protective film on the exterior surface of the electronic device comprising the fingerprint sensor; wherein the protective film is arranged to at least partially cover the fingerprint sensor; wherein at least a portion of the film comprises an electrically conductive pattern configured to enable verification of a functionality of the fingerprint sensor, the pattern being arranged to cover the fingerprint sensing device; capturing an image using the fingerprint sensor; and verifying a functionality of the fingerprint sensor by correlating the captured image with the electrically conductive pattern of the protective film.

According to an embodiment of the invention, the step of verifying a functionality of fingerprint sensor may advantageously comprise at least one of analyzing the contrast of a captured image and analyzing a histogram of the captured image.

Advantages, effects and features of the second and third aspect of the invention are largely analogous to those described above in connection with the first aspect of the invention.

Further features of, and advantages with, the present invention will become apparent when studying the appended claims and the following description. The skilled person realize that different features of the present invention may be combined to create embodiments other than those described in the following, without departing from the scope of the present invention.

BRIEF DESCRIPTION OF THE DRAWINGS

These and other aspects of the present invention will now be described in more detail with reference to the appended drawings showing an example embodiment of the invention, wherein.

DETAILED DESCRIPTION OF PREFERRED EMBODIMENTS OF THE INVENTION

In the present detailed description, various embodiments of a fingerprint sensing device according to the present invention are mainly discussed with reference to a capacitive fingerprint sensing device.

Figure 1:
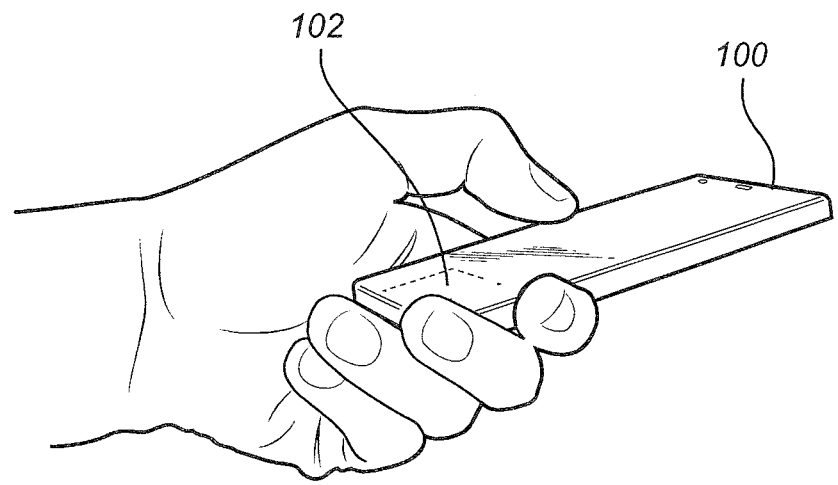
FIG. 1 schematically illustrates a handheld electronic device comprising a fingerprint sensing device according to an embodiment of the invention.

FIG. 1 is a schematic illustration of a handheld electronic device 100 in the form of a smartphone comprising a fingerprint sensor 102. A fingerprint sensor 102 can be used for example in a mobile phone, a smartphone, a tablet computer, a portable computer or any other electronic device requiring a way to identify and/or authenticate a user.

FIG. 2a is a schematic illustration in the form of an exploded view of a handheld electronic device 100 comprising a body 202, a fingerprint sensor 102 arranged in the body 202, a display glass 204 covering the image display of the handheld device and the majority of remaining portions of a front surface of the device 100. A protective plate 206 covering the fingerprint sensor 102 forms the sensing surface of the fingerprint sensor 102, and a protective film 208 is arranged to cover both the sensing surface of the fingerprint sensor 102 and the display glass 204. The protective film 208 further comprises an electrically conductive pattern 210 configured to enable verification of a functionality of the fingerprint sensor 102. The fingerprint sensor 102 is a capacitive fingerprint sensor comprising an array of sensing elements 212, where each sensing element is connected to readout circuitry (not shown) for detecting a capacitive coupling between the sensing element 212 and a finger placed on the sensing surface of the fingerprint sensor. The array of sensing elements 212 is typically covered by a mold, onto which the protective plate 206 is attached by means of an adhesive. The fingerprint sensor 102 may also comprise other layers or coatings.

Even though the fingerprint sensing surface is described herein as comprising a protective plate 206 separate from the display glass 204, the sensing surface may equally well be part of a display glass configured to cover both the display and the fingerprint sensing device. Furthermore, the sensing surface may be located on a side of an electronic device which does not comprise a display.

The protective plate 206 typically comprises a dielectric material in order to provide a good capacitive coupling between a finger placed on the plate and the sensing elements 212 of the fingerprint sensor. In particular, the protective plate 206 may advantageously comprise a glass or ceramic material, such as a chemically strengthened glass, $ZrO_2$ or sapphire. The above materials all provide advantageous properties in that they are hard and resistant to wear and tear, and in that they are dielectric thereby providing a good capacitive coupling between a finger placed on the surface of the protective plate 206 and the sensing elements 212 of the fingerprint sensor 102.

The protective film 208 is here illustrated as a transparent flexible film made from a plastic material. In the present exemplary embodiments, the electrically conductive pattern is formed from a metal. However, the electrically conductive pattern may also be formed from another electrically conductive material such a conductive polymer or ITO. The thickness of the protective film 208 can be selected based on what is required for a particular application and for a specific electronic device. As an example, a thin plastic foil having a thickness as low as 10 µm may be used, as well as plastic films having a thickness of approximately 200 µm.

Furthermore, the protective film 208 is illustrated as covering both the display of the device as well as the fingerprint sensor 102, i.e. covering the entire surface of the electronic device 100 comprising the fingerprint sensor 102. Alternatively, the protective film 208 may be made up of two or more separate parts, where a first part can be configured to comprise the electrically conductive pattern and be arranged to only cover the fingerprint sensor 102. A second part of the protective film could thus cover the remainder, or selected portions, of the surface of the electronic device. Providing the part of the protective film covering the fingerprint sensor separately from the remainder of the protective film can for example be advantageous if the fingerprint sensor is arranged on a surface of the electronic device where no protective film is otherwise required.

Tests have shown that a thickness of the electrically conductive metal pattern of 50 µm provides a capacitive coupling allowing an image of sufficiently high quality to be captured, in order to allow analysis of the image to verify a functionality of the fingerprint sensor. However, the required metal thickness depends on the distance between the sensing element and the metal pattern, on the electrical properties of the material between the sensing element and the metal pattern and on the specific properties of the sensing element and readout circuitry. Accordingly, the metal thickness may be lower than 50 µm, the basic requirement being that the electronically conductive pattern must fulfill the requirements for an image to be captured, i.e. to generate the capacitance needed for the pixel to detect coverage.

FIGS. 3a-f schematically illustrate a number of exemplary patterns which may be used for performing various tests of the fingerprint sensor 102 to verify that the sensor is functional. The patterns are illustrated as having a rectangular outline where the black portions correspond to the portions of the film comprising an electrically conductive material. The rectangular patterns may be used both for a rectangular fingerprint sensor as well as for a sensor having a circular shape. Alternatively, patterns having a circular outline can be provided. Moreover, the pattern may also extend outside of the sensing surface of the fingerprint sensor.

As an example, for a feature to be resolvable, the smallest size of a pattern feature is approximately 250 µm. More preferably, the minimum feature size of the pattern is about 500 µm. A feature size in the range of 250 to 500 µm roughly corresponds to the size of a fingerprint ridge. In a fingerprint sensor having a pixel size of 50×50 µm, the minimum feature size would thus correspond to 5 pixels.

Figure 3A:
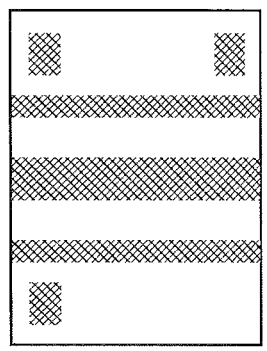
FIGS. 3a-f are schematic illustrations of electrically conductive patterns according to various embodiments of the invention.

In the pattern in FIG. 3a, the rectangular portions are used as alignment marks to determine the orientation of the pattern on the sensor, and the parallel lines can be used for contrast measurements. From a contrast measurement, the measured contrast between black and white is analyzed allowing the distance between the electrically conductive pattern and the sensing element to be determined. Assuming that the pattern is in contact with the sensing surface of the fingerprint sensor and that the thickness of the protective plate is known, the contrast measurement can thereby be used to estimate e.g. the mold and coating thickness of the sensor.

Figure 3B:
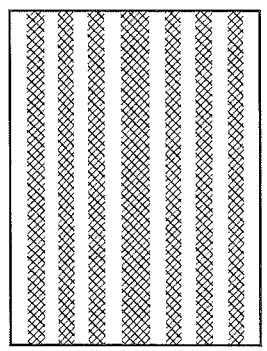

FIG. 3b illustrates a stripe pattern comprising parallel lines of different thickness which can be used for a contrast measurement. By analyzing the contrast over the full surface area of the fingerprint sensor, the uniformity of the mold and coating thickness can be estimated.

Figure 3C:
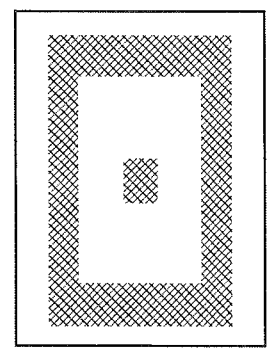

FIG. 3c illustrates an alternative embodiment of a pattern comprising a rectangular alignment mark as well as lines for contrast measurement.

Figure 3D:
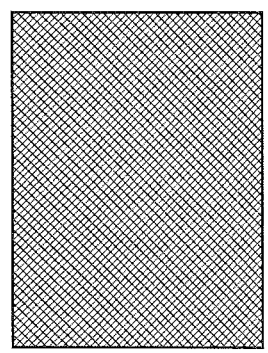

FIG. 3d illustrates a solid pattern where the entire sensing surface is covered by an electrically conductive material. A uniformly "black" pattern can be used to determine the uniformity of the sensor. From a uniformity measurement, scratches in the sensing surface or other defects can be detected. The uniformity measurement can also provide information about the uniformity of the mold and coating thickness.

Figure 3E:
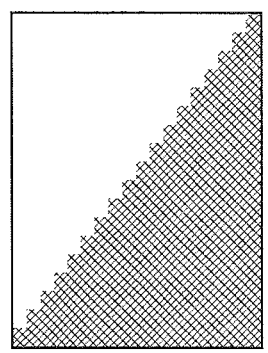

FIG. 3e illustrates a pattern suitable for a histogram measurement, where the expected outcome is two well defined peaks in the histogram. The width of the peaks provides an indication of the quality of the measurement. Moreover, the presence of additional peaks in the histogram would be an indication of a defect in the sensor.

Figure 3F:
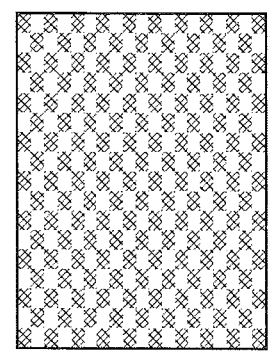

FIG. 3f illustrates a checkerboard pattern comprising white and black squares which also is suitable for a histogram measurement, and which may also be used to determine the contrast.

When using a pattern which is not a solid pattern, it is also possible to evaluate the portion of pixels providing a capacitance which is within the "black" and "white" range, respectively. As an example, for a pattern where 50% of the area of the fingerprint sensor covered by an electrically conductive material, ideally 50% of the pixels should give a capacitance value corresponding to black and 50% should give a capacitance value corresponding to white. However, the sensor may be functional even if a number of pixels provide capacitance values in the intermediate grayscale range. Accordingly, as it can be assumed that the area coverage of the pattern is known, a measurement can be used to evaluate the number and thereby percentage of pixels providing accurate capacitance measurements.

The patterns illustrated in FIGS. 3a-f may be combined in any number of ways for example so that different portions of the pattern are used for evaluating different features, or so that different portions of the pattern are used to evaluate the same functionality but in different ways.

Moreover, the fingerprint sensor may comprise an electrically conductive ring or frame encircling the sensor and which ring is exposed adjacent to the sensing surface. Such an electrically conductive ring may also be referred to as a bezel, drive electrode, excitation electrode or grounding electrode. The function of the electrically conductive ring can be to provide an electrical potential to a finger placed on the fingerprint sensor in order to facilitate the capacitance measurement, or the function can be to ground the finger to ensure that the finger is at ground potential. If the fingerprint sensor comprises a bezel structure, the electrically conductive pattern can easily be configured to be in electrical contact with the bezel. With reference to FIG. 3, the patterns of FIGS. 3b, d, e and f would be in contact with a conductive ring surrounding the fingerprint sensor simply by extending the pattern so that the outer portions of the pattern are located on top of the ring. In FIGS. 3a and 3c, the features of the pattern could be connected to a surrounding electrically conductive ring by means of separate connection lines (not shown) electrically connecting each feature to the edge of the pattern. The connection lines can be made substantially narrower than the lines of the pattern used for testing the functionality of the fingerprint sensor, and such connection lines could thus be incorporated without influencing the test pattern.

In a fingerprint sensor which does not comprise a bezel around the sensor, the potential of the sensing elements may be varied while the finger is maintained a fixed potential to facilitate capacitance measurement. The finger in itself can be considered to be at a fixed potential, i.e. ground, since due to the large mass of the finger, the potential of the finger will not be influenced by a varying potential in the sensing element.

An electrically conductive pattern for a fingerprint sensor without a bezel can also be configured to be at a fixed potential in applications where the sensing elements have a varying potential. For example, the pattern can be extended outside of the sensing surface to be in electrical contact with a ground potential. A ground potential could for example be contacted via a frame of the electronic device. Alternatively, the electrically conductive pattern can have a sufficient mass so that it is not influenced by a changing potential of the sensing elements.

Figure 2:
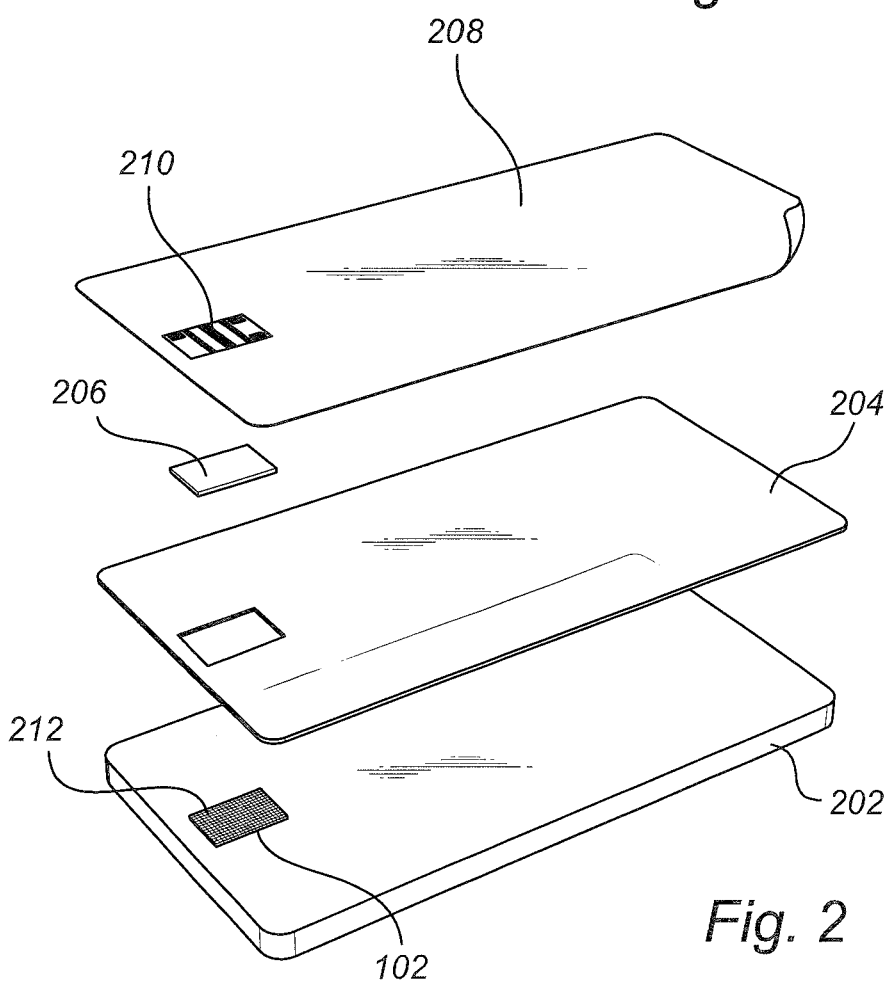
FIG. 2 schematically illustrates a fingerprint sensing device according to an embodiment of the invention.
Figure 4:
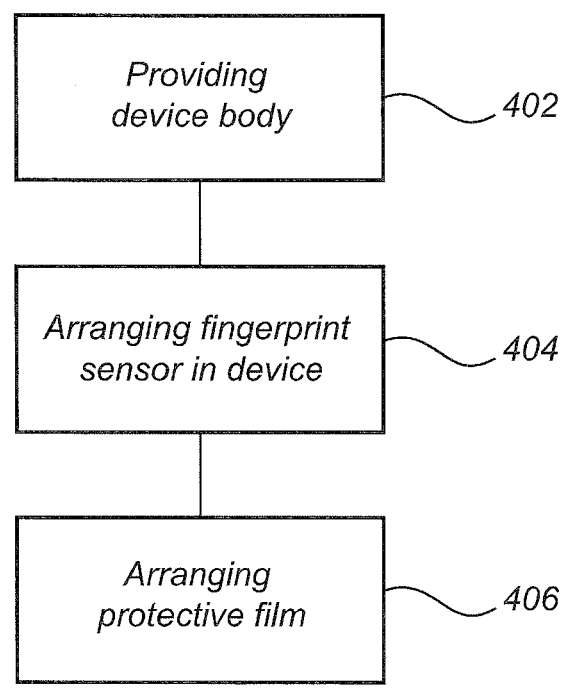
FIG. 4 is a flow chart outlining the general steps according to an embodiment of the invention.

The flow chart of FIG. 4, with further reference to FIG. 2, outlines the general steps of a method for manufacturing an electronic device comprising a fingerprint sensor.

The body 202 of an electronic device 100 is provided 402, and a fingerprint sensor 102 is arranged 404 within the body so that the sensing surface of the fingerprint sensor 102 forms a part of the exterior surface of the electronic device 100. After that, a protective film 208 is arranged 406 on the electronic device 100 so that the fingerprint sensor 102 is at least partially covered by a portion of the protective film comprising an electrically conductive pattern 210.

The steps of the manufacturing method need not be performed in the specific order mentioned and illustrated herein. It should be understood that the order of the steps are determined by the assembly process for the particular electronic device in which the fingerprint sensor is arranged. In particular, it would be possible to arrange a separate first protective film comprising an electrically conductive pattern onto the fingerprint sensor prior to arranging the sensor in the electronic device. A second protective film having a cut-out corresponding to the first protective film could then be arranged on the electronic device after it has been fully assembled. It would also be possible to arrange a second protective film covering the entire surface area of the electronic device, including the protective film having an electrically conductive pattern.

After the protective film with a conductive pattern has been arranged on the fingerprint sensor, the electronic device is ready for testing. Test and verification of the functionality of the fingerprint sensor is typically performed by capturing an image which is subsequently analyzed using dedicated algorithms. Accordingly, using different software-implemented algorithms on a captured image, different features or aspects of the fingerprint sensor can be verified using a single captured image. The captured image can be analyzed by software present in the electronic device. It is also possible to connect external hardware, such as a PC, to the electronic device for performing the analysis of the captured image.

Figure 5A:
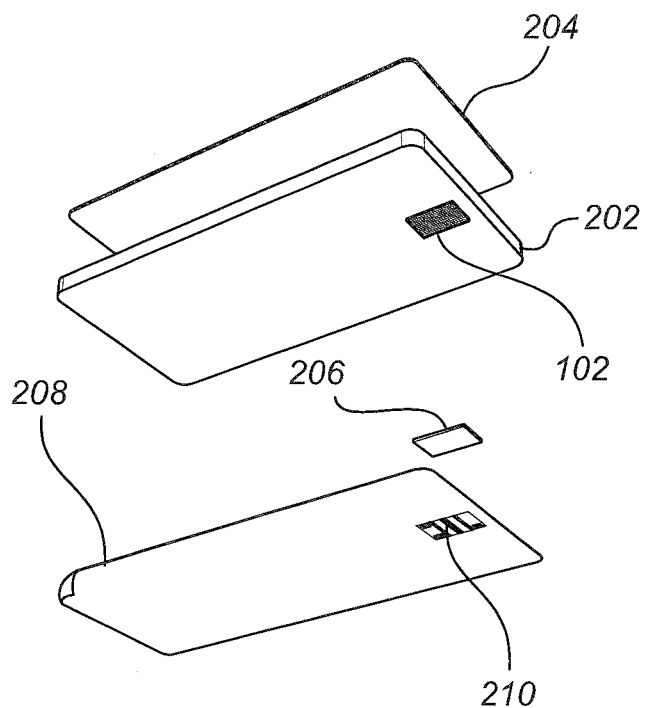
FIGS. 5a-b are schematic illustrations of electronic devices according to example embodiments of the invention.

FIG. 5a is a schematic illustration of a handheld device where the fingerprint sensor 102 is arranged on the backside of the device, i.e. on a side opposite the display.

Figure 5B:
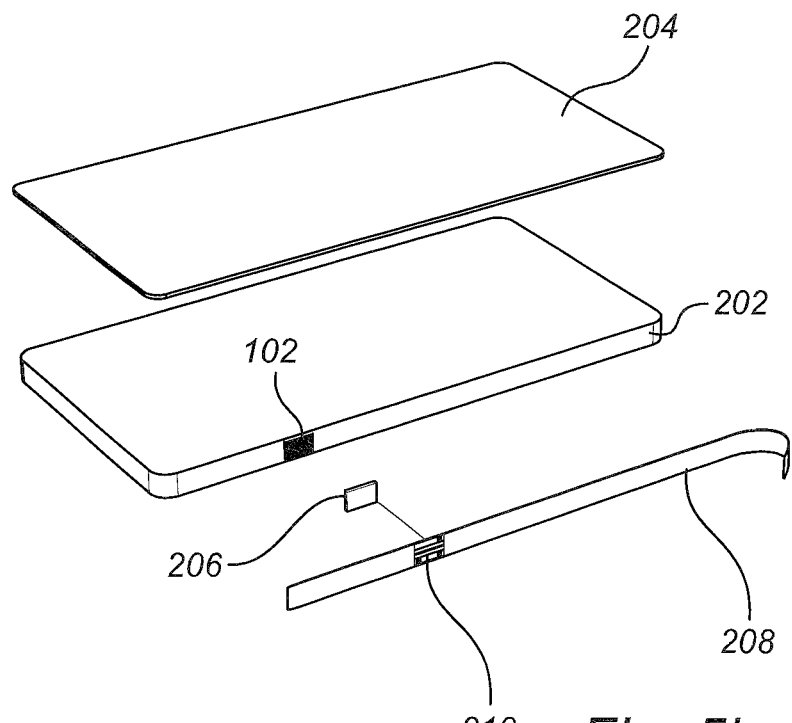

FIG. 5b is a schematic illustration of a device where the fingerprint sensor 102 is arranged on a side of the device.

Even though the invention has been described with reference to specific exemplifying embodiments thereof, many different alterations, modifications and the like will become apparent for those skilled in the art. Also, it should be noted that parts of the device may be omitted, interchanged or arranged in various ways, the sensor device yet being able to perform the functionality of the present invention.

Additionally, variations to the disclosed embodiments can be understood and effected by the skilled person in practicing the claimed invention, from a study of the drawings, the disclosure, and the appended claims. In the claims, the word "comprising" does not exclude other elements or steps, and the indefinite article "a" or "an" does not exclude a plurality. The mere fact that certain measures are recited in mutually different dependent claims does not indicate that a combination of these measures cannot be used to an advantage.

The invention claimed is:

1. An electronic device comprising:
   a capacitive fingerprint sensor having a fingerprint sensing surface forming part of an exterior surface of said electronic device;
   a protective film arranged on at least a portion of said exterior surface of said electronic device comprising said fingerprint sensing surface, wherein said protective film is arranged to at least partially cover said fingerprint sensing surface; and
   wherein said protective film comprises an electrically conductive verification pattern covering at least a portion of said fingerprint sensing surface such that the fingerprint sensor can be controlled to capture an image corresponding to the electrically conductive verification pattern.

2. The electronic device according to claim 1, wherein said electrically conductive verification pattern comprises alignment marks configured to enable determination of an alignment of said electrically verification conductive pattern.

3. The electronic device according to claim 1, wherein said electrically conductive verification pattern comprises a solid pattern, stripe pattern or checkerboard pattern.

4. The electronic device according to claim 1, wherein said electrically conductive verification pattern is transparent.

5. The electronic device according to claim 1, wherein said electrically conductive verification pattern is arranged at a distance from said sensing surface not exceeding 200 µm.

6. The electronic device according to claim 1, wherein said electrically conductive verification pattern is arranged on a side of said protective film facing said sensing surface of said fingerprint sensor.

7. The electronic device according to claim 1, wherein said electrically conductive verification pattern is printed on said protective film.

8. The electronic device according to claim 1, wherein said electrically conductive verification pattern is embedded in said protective film.

9. The electronic device according to claim 1, wherein said protective film is a transparent plastic film.

10. The electronic device according to claim 1, wherein said protective film covers a majority of the surface of the electronic device comprising said fingerprint sensing surface.

11. The electronic device according to claim 1, wherein said fingerprint sensing surface forms part of a surface of an electronic device comprising a display.

12. The electronic device according to claim 1, wherein said fingerprint sensor comprises an electrically conductive ring surrounding said fingerprint sensor, and wherein said electrically conductive verification pattern is arranged to be in electrical contact with said ring.

13. A method for manufacturing an electronic device comprising the steps of:
providing a body of an electronic device;
providing a fingerprint sensor having a sensing surface;
arranging said fingerprint sensor in said body of said electronic device such that said sensing surface forms part of an exterior surface of said electronic device; and
arranging a protective film on said exterior surface of said electronic device comprising said fingerprint sensing surface; wherein said protective film is arranged to at least partially cover said fingerprint sensing surface; wherein at least a portion of said film comprises an electrically conductive verification pattern such that the fingerprint sensor can be controlled to capture an image corresponding to the electrically conductive verification pattern, said pattern being arranged to cover said fingerprint sensing device.

14. A method for verifying a functionality of a fingerprint sensor having a fingerprint sensing surface forming part of an exterior surface of an electronic device, the method comprising the steps of:
arranging a protective film on said exterior surface of said electronic device comprising said fingerprint sensing surface; wherein said protective film is arranged to at least partially cover said fingerprint sensing surface, wherein at least a portion of said protective film comprises an electrically conductive verification pattern, said pattern being arranged to cover said fingerprint sensing device;
capturing an image using said fingerprint sensor, said image corresponding to the electrically conductive verification pattern; and
verifying a functionality of said fingerprint sensor by correlating said captured image with said electrically conductive verification pattern of said protective film.

15. The method according to claim 14, wherein said step of verifying a functionality of said fingerprint sensor comprises at least one of;
analyzing the contrast of said captured image; and
analyzing a histogram of said captured image.

* * * * *